Sept. 25, 1956   T. DE FOREST   2,764,733
METHOD AND MEANS FOR DETECTING FLAWS
Filed May 3, 1952
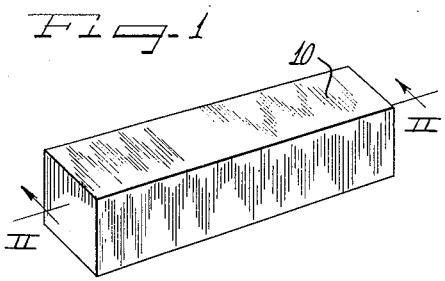
Fig. 1
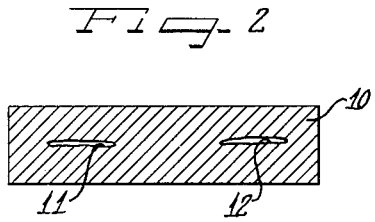
Fig. 2
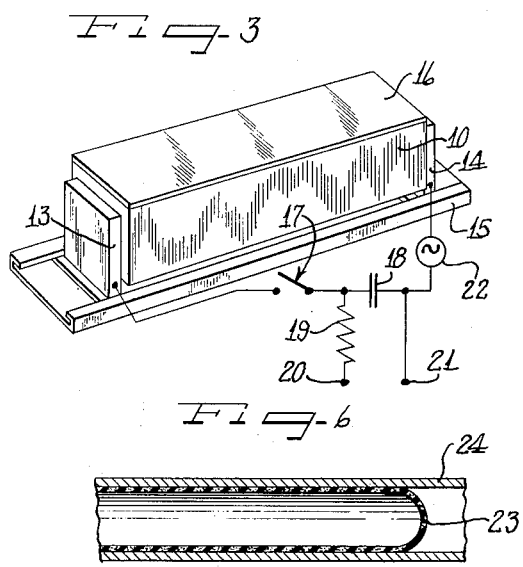
Fig. 3
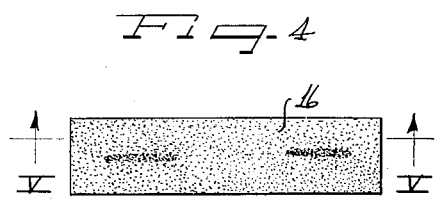
Fig. 4
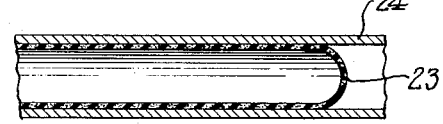
Fig. 6
Fig. 5
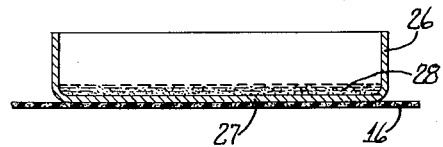
Fig. 7
Fig. 8
Inventor
Taber de Forest
by Hill, Sherman, Meroni, Gross & Simpson
Attys United States Patent Office 2,764,733
Patented Sept. 25, 1956

2,764,733

METHOD AND MEANS FOR DETECTING FLAWS

Taber de Forest, Northbrook, Ill., assignor to Magnaflux Corporation, Chicago, Ill., a corporation of Delaware Application May 3, 1952, Serial No. 285,966

9 Claims. (Cl. 324—38)

This invention relates to a method and means for detecting flaws and more particularly to a method and means of flaw detection by which a visual indication of flaws in a test piece is obtained on a member independent of the test piece.

According to this invention, a member having uniformly distributed magnetizable material therein, preferably a sheet of electrically insulating material having iron oxide particles dispersed therein, is placed on a surface portion of the article to be tested for flaws and a magnetic flux is induced in the article. The magnetic flux will be generally uniform over the surface portion of the article except as distorted by defects in the article and the flux pattern over the surface portion will be transferred to the sheet by permanent magnetization of the magnetizable material therein. The sheet may then be removed from the article and free particles of magnetizable material are then placed over the surface of the sheet. These particles will be generally uniformly distributed over the sheet except portions of the sheet highly magnetized by the effect of flaws in the article tested for defects. The particles will be attracted to such portions and bunched together to provide a clear visual indication of flaws in the article tested.

This invention has the advantage of providing a permanent record of flaws in the article. In addition, the invention may be used to test under surfaces and other relatively inaccessible surfaces of articles for flaws. Moreover, the invention is very efficient and provides a much clearer indication of flaws than methods and apparatus previously used. Still further, the invention is highly efficient from the standpoint of power and equipment because only a short impulse of magnetization of the article to be tested is necessary.

Another advantage is that magnetizable particles in the sheet are fixed and only the strength and direction of magnetization affect them. They are not free to migrate into areas of high field strength and, hence, mask presence of cracks or other flaws.

According to a particular feature of this invention, means are provided for inducing only a short impulse of flux in the article thus permitting use of a power supply with a very low power capacity.

According to another feature of this invention, the thickness of the test sheet is so related to the depth of flaws below the surface of the article tested that optimum results are obtained.

A further feature of this invention is in the provision of a method and means for testing the internal surfaces of pipes or the like for flaws.

Still another feature of this invention is in the provision of a plate of magnetizable material over the test member to greatly increase the magnetization of the material in the test member when the magnetic flux is induced in the article to be tested.

An object of this invention, accordingly, is to provide an improved means for testing articles for defects.

Another object of this invention is to provide an improved method for detecting flaws in articles.

A further object of this invention is to provide an improved method and means for testing articles for flaws or defects wherein a permanent record is obtained.

Still another object of this invention is to provide an improved means and method for testing articles for flaws wherein the necessary power capacity of equipment is minimized.

A still further object of this invention is to provide an improved method and means for testing internal surfaces of pipes or the like for flaws.

This invention contemplates other objects, features and advantages which will become more fully apparent from the following detailed description taken in conjunction with the accompanying drawings which illustrate preferred embodiments and in which:

Figure 1 is an isometric view of an article which may be tested by the method and means of this invention;

Figure 2 is a cross-sectional view taken substantially along lines II—II of Fig. 1 and illustrating flaws or defects in the article;

Figure 3 is an isometric view illustrating the article of Figs. 1 and 2 held in magnetizing apparatus of this invention with a test member placed on a surface portion of the article;

Figure 4 is a view illustrating a test member having free particles of magnetizable material disposed on the surface thereof and illustrating how a clear visual indication of flaws is obtained;

Figure 5 is a cross-sectional view taken substantially alone lines V—V of Fig. 4 and illustrating a preferred composition of the test member;

Figure 6 is a view illustrating a tube-like test member placed inside the pipe or the like so that the internal surface portion of the pipe can be readily tested;

Figure 7 is a view illustrating a plate of magnetizable material placed over the test member to enhance the magnetization thereof; and Figure 8 is a view illustrating another preferred method and means for giving a visual indication of the flux distribution in the test member so as to indicate flaws or defects in the article tested.

Reference numeral 10 designates an article which may be tested by the method and means of this invention. The article 10 to be tested may be of any electrically conductive material whether magnetic or non-magnetic but the method and means of this invention are peculiarly and particularly advantageous with test articles of magnetizable material such as iron or steel. The cross-sectional view of Fig. 2 illustrates flaws or defects 11 and 12 in the test article 10. The method and apparatus of this invention are used to give a clear permanent record and indication of such flaws or defects.

In Fig. 3, the article 10 is held between a pair of supports 13 and 14 which may be adjustably supported on a frame 15. A member 16 of uniformly distributed magnetizable material is placed over a surface portion of the test article 10 and a magnetic flux is induced in the test article 10 to uniformly magnetize the material in the member 16 except as distorted by flaws or defects such as the flaws 11 and 12 in the article 10.

It will be understood that any method of or means for inducing the magnetic flux in the article 10 might be used such as a steady direct current conducted therethrough, a permanent magnet or a coil energized from a source of direct current. A preferred and peculiarly advantageous method and means is illustrated in Fig. 3, in which the support 13 is connected through a switch 17 to one side of a capacitor 18 with the support 14 connected to the other terminal of the capacitor 18. The capacitor 18 may be slowly charged up through a resistor 19 from a source of high D.-C. voltage connected to the terminals 20 and 21. After the capacitor 18 is charged up, the switch 17 may be closed to provide a short impulse of very high current which will flow between the contacts 13 and 14 through the article 10 and induce a high instantaneous flux in the article 10. This flux will uniformly magnetize the material in the test member 16 except as distorted due to the presence of flaws or defects in the test article 10. It will be apparent that this method and means for providing the flux is highly advantageous since the charging period for the capacitor 18 may be very long compared with the discharge period and the source of power connected to the terminals 20 and 21 need supply only a very small average current.

It will be understood that means other than the arrangement above described may be used to induce a short impulse of high flux in the article 10 while conserving on size and power capacity of apparatus required.

In combination with a unidirectional magnetizing flux, an alternating biasing flux may be used to achieve a magnetization of the member 16 more closely alike the internal structure of the article 10. Again, this may be accomplished in any desired manner, one method being illustrated in Figure 3 in which a source of alternating current 22 is connected in series between one side of the capacitor 18 and the support 14. Upon closing of the switch 17, an alternating current from source 22 will be superposed on a unidirectional current from the capacitor 18. A pulsating direct current might also be used. It will be apparent that the arrangement of Figure 3, however, is highly advantageous in achieving optimum results with a minimum of equipment necessary.

After the member 16 is magnetized, it may be removed from the article 10 and free magnetizable particles such as powdered iron may be disposed over the surface portion thereof. The particles will uniformly distribute themselves over the test member 16 except that they will be attracted to highly magnetized portions of the member 16 which had been over flaws or defects in the article 10 in the magnetization step. The accumulation of particles over such portions of the member 16 will provide a very clear visual indication of flaws or defects as illustrated in Fig. 4.

The test member 16 may be of any composition in which magnetizable material is generally uniformly distributed therein. Greatly improved results are, however, obtained by the composition of electrically insulating material with iron or iron oxide particles embedded therein. Plastic and the like materials are suitable while elastomeric material such as rubber and the like are preferred since, with a flexible sheet form, the member 16 may be readily disposed against complex surfaces of articles tested.

A particular feature of the invention is that the member 16 may be disposed against undersurfaces or other relatively inaccessible surfaces of article to be tested for flaws. The advantages of this invention, in this respect, are readily apparent from Fig. 6 which illustrates a member 23 in the form of a tube disposed inside a pipe 24 for testing the pipe for flaws and defects. In this case, the member 23 is preferably of an elastomeric material such as rubber with magnetizable particles such as iron or iron oxide particles dispersed therein. The tube 23 may then have a diameter, in its unflexed condition, less than the inside diameter of the pipe 24 to be tested, so that it can be readily disposed inside the pipe, and then it may be inflated by compressed air, for example, so as to snugly engage the inner surface of the pipe 24. The tube 23 may then be deflated and removed from the pipe after which iron particles may be dispersed thereon to indicate flaws in the pipe.

According to another feature of this invention, the thickness of the sheet member 16, or of the tube 23, is so related to the depth of flaws tested for in the article 10 or pipe 24 that optimum results are obtained. The distortion in flux distribution due to a defect in the test article 10 or pipe 24 causes opposite magnetic polarization of the magnetizable particles or material in the test members 16 or 23 spaced on opposite sides of the defect and, for a maximum of magnetization of particles in the test members 16 or 23, it is desirable that the magnetizable material or particles within the members 16 or 23 form a complete flux path inside the same. It has been found that the thickness of the test members 16 or 23 must be at least 0.1 the depth of the defect below the surface of the article 10 or 24 in order to give optimum results with a clear visual indication of the defect.

As an alternative to, or in addition to, making the thickness of the test member 16 proportionate to the depth of defect to be tested for in the article 10 as described above, the arrangement of Fig. 7 may be used in which a plate member 25 of magnetizable material such as iron is placed over the test member 16 to provide a good flux path and effective magnetization of particles in the test member 16 so as to insure a good indication of defects located at substantial depths below the surface of the article 10.

Flux may be induced in the pipe 24 by the preferred apparatus and method of Figure 3 or in any desired manner.

Another feature of this invention is illustrated in Fig. 8 in which a container or pan 26 has a generally flat bottom 27 covered with a liquid such as oil in which particles of magnetizable material such as iron are suspended. The pan 26 is placed over the test member 16 and the particles suspended in the liquid 28 may move freely and accumulate over highly magnetized portions of the member 16 to give a clear visual indication of defects. In this manner, the pan 26 may be used over and over again, eliminating the necessity of dispersing or dusting particles over the member 16 for each test.

It will be apparent that this invention is highly advantageous in providing a very clear indication of flaws in articles, a permanent record of flaws in an article and an efficient test of relatively inaccessible surfaces of articles with relative ease and with a minimum in amount and size of equipment.

It will also be understood that modifications and variations may be effected without departing from the spirit and scope of the novel concepts of the present invention.

I claim as my invention:

1. Apparatus for testing an article for defects, comprising: means for inducing a magnetic flux in the article substantially uniform over a surface portion thereof except as distorted by defects therein, and a member having permanently uniformly distributed magnetizable material therein and arranged for disposition with a surface portion thereof proximate the surface portion of the article.

2. Apparatus for testing an article for defects, comprising: a member having uniformly distributed magnetizable material therein and arranged for disposition with a surface portion thereof proximate a surface portion of the article, and means for inducing a magnetic flux in the article including a capacitor arranged to be charged from a source of power and discharged through said article to induce a short impulse of high flux therein and uniformly magnetize the magnetizable material of said member except as distorted by defects in the article.

3. Apparatus for testing an article for defects, comprising: means for inducing a magnetic flux in the article substantially uniform over a surface portion thereof except as distorted by defects therein, a member having uniformly distributed magnetizable material therein and arranged for disposition with a surface portion thereof proximate said surface portion of the article, and means for indicating defects including freely movable magnetizable particles arranged for disposition over said surface portion of said member.

4. Apparatus for testing an article for defects, comprising: means for inducing a magnetic flux in the article substantially uniform over a surface portion thereof except as distorted by defects therein, a member having uniformly distributed magnetizable material therein and arranged for disposition with a surface portion thereof proximate said surface portion of the article, and means for indicating defects including freely movable magnetizable particles suspended in a liquid.

5. In a method of testing a pipe or like article for defects, the steps of providing a tube having generally uniformly distributed magnetizable material therein, disposing said tube inside the article, and inducing magnetic flux in the article.

6. In a method of testing a pipe or like article for defects, the steps of providing a tube having generally uniformly distributed magnetizable material therein, disposing said tube inside the article, expanding said tube into snug engagement with the inner surface of the article, and inducing magnetic flux in the article.

7. Apparatus for testing an article for defects, comprising: means for inducing a unidirectional magnetic flux in the article substantially uniform over a surface portion thereof except as distorted by defects therein, means for inducing an alternating biasing flux superposed on said unidirectional flux, and a member having uniformly distributed magnetizable material therein and arranged for disposition over a surface portion of the article.

8. In a method of testing an article for defects, the steps of providing a member having uniformly distributed magnetizable material therein, disposing said member over a surface portion of the article, inducing a unidirectional magnetic flux in said article, and simultaneously inducing an alternating biasing flux superposed on said unidirectional flux.

9. In a method of testing an article for defects, the steps of providing a member having uniformly distributed magnetizable material therein, disposing said member over a surface portion of the article, and inducing a unidirectional magnetic flux in said article.

References Cited in the file of this patent

UNITED STATES PATENTS

| | | |
|---|---|---|
| 2,136,375 | De Forest | Nov. 15, 1938 |
| 2,236,373 | Kowalski | Mar. 25, 1941 |
| 2,242,366 | Muller | May 20, 1941 |
| 2,252,475 | Unger et al. | Aug. 12, 1941 |
| 2,530,564 | Blaney | Nov. 21, 1950 |
| 2,532,876 | Asche et al. | Dec. 5, 1950 |
| 2,589,766 | Bernstein | Mar. 18, 1952 |
| 2,666,813 | Camras | Jan. 19, 1954 |

FOREIGN PATENTS

| | | |
|---|---|---|
| 497,095 | Great Britain | Dec. 13, 1938 |
| 604,078 | France | Jan. 16, 1926 |

OTHER REFERENCES

Electronics, December 1949, pages 78–83.